United States Patent [19]

Hahn et al.

[11] Patent Number: 5,945,144
[45] Date of Patent: Aug. 31, 1999

[54] CALCIUM FORTIFIED PASTA AND PROCESS OF MAKING

[76] Inventors: David H. Hahn, 654 Waltonville Rd., Hummelstown, Pa. 17036; Michael L. Nolt, 508 Prospect Rd., Elizabethtown, Pa. 17022; Frank P. Paris, 1305 Edgewood Dr., Hummelstown, Pa. 17036

[21] Appl. No.: 09/079,557

[22] Filed: May 15, 1998

Related U.S. Application Data

[63] Continuation-in-part of application No. 08/676,800, Jul. 8, 1996, abandoned.

[51] Int. Cl.$^6$ ............................ A23L 1/304; A23P 1/12
[52] U.S. Cl. ........................... 426/74; 426/516; 426/557; 426/658
[58] Field of Search ........................... 426/74, 516, 557, 426/658

[56] References Cited

U.S. PATENT DOCUMENTS

| | | |
|---|---|---|
| 3,949,101 | 4/1976 | Murthy . |
| 4,120,989 | 10/1978 | Grindstaff et al. . |
| 4,361,591 | 11/1982 | Tauflq . |
| 4,466,985 | 8/1984 | Tsen et al. . |
| 5,087,470 | 2/1992 | Sarabhai . |
| 5,211,977 | 5/1993 | Hauser et al. . |
| 5,508,053 | 4/1996 | Villota et al. . |

FOREIGN PATENT DOCUMENTS

| | | |
|---|---|---|
| 60102-158 | 11/1983 | Japan . |
| 61141-54 | 12/1984 | Japan . |
| 405304928 | 11/1993 | Japan . |
| 2 079 287 | 1/1982 | United Kingdom . |

OTHER PUBLICATIONS

Jae Ryu, et al., Korean J. Food Sci. Technol., Effect of Calcium Phosphate Hydroxyapatite on Rheological Properties of Wheat Flour and Corn Starch, vol. 23, No. 5, pp. 642–645 (1991).

Food Engineering Int'l, Tracing The Marketing Allure of Calcium Fortification, Dec. 1986, pp. 17–18.

E.F. Schoppet, et al. Journal Of Food Science, Macaroni Enrichment With Dairy–Based Protein Sources, vol. 44, No. 1 (1979) pp. 296–297.

Elmer Glabe, et al., Cereal Science Today, Macaroni Made With Nonfat Milk, Dec. 1967, vol. 12, No. 12, pp. 510–511, 532.

Laurie Quint, Nutrition Action Healthletter, The New Calcium Crop, Oct. 1986, pp. 10–11.

Martin Friedman, Prepared Foods, Grain–Based Products Promote Well–Bred Bodies, Jan. 1993, p. 49.

Matthews, et al., Cereal Chemistry, "Nutrient Composition of Selected Wheat Products", Sep./Oct. 1979, vol. 54, #5, pp. 115–1123.

Donna V. Porter, Washington Update: NIH Consensus Development Conference Statement Optimal Calcium Intake, Nutrition Today, Sep./Oct., vol. 29, No. 5.

Therese Desrosiers, et al., Effectiveness of Organic Chelators in Solubilizing Calcium and Zinc in Fortified Cereals Under Simulated Gastrointestinal pH Conditions, Journal of Food Processing and Preservation, 13, (1989), pp. 307–319.

M.H. Lee, et al., Physicochemical Properties of Calcium–Fortified Rice, 1995, Cereal Chem. 72(4), pp. 352–355.

David H. Hahn, "Application of Rheology in the Pasta Industry", Dough Rheology and Baked Product Texture, Chapter 9, ed. H. Farido and J. Faabion, Publisher Van Nostrand Rheinhold, NY (1990).

Anna Renz–Schauen, et al., Fortification of Nondairy Foods With Dairy Ingredients, Food Technology, Oct. 1987, pp. 122–123, 127.

*Primary Examiner*—Helen Pratt
*Attorney, Agent, or Firm*—Scully, Scott, Murphy & Presser

[57] ABSTRACT

The present invention is directed to a calcium fortified pasta and the process of preparing the same. The pasta product contains about 75% wheat flour, water and at least 800 mg to 8000 mg of calcium per pound of product. The process includes mixing the ingredients and at least 800–8000 mg calcium per pound of pasta product, extruding, then drying the pasta at temperatures from about 130° F. to about 200° F. and at a relative humidity sufficient to control the drying rate to a moisture content of about 13%.

35 Claims, No Drawings

CALCIUM FORTIFIED PASTA AND PROCESS OF MAKING

RELATED APPLICATIONS

This is a continuation-in-part of application U.S. Ser. No. 08/676,800 filed on Jul. 8, 1996 now abandoned.

FIELD OF THE INVENTION

The present invention relates to calcium fortified pasta and to processes for making the same.

BACKGROUND OF THE INVENTION

Calcium is an extremely important mineral nutrient that helps prevent osteoporosis and softening of the bone. Unfortunately, in today's busy world, many Americans neglect ingesting, either through foods or vitamin supplements, the daily recommended dosage of calcium to minimize the risk of being afflicted with calcium deficiency related diseases. In fact, studies have confirmed that intakes of calcium today in the United States are well below the 1989 Recommended Dietary Allowance (RDAs) set by the Food and Nutritional Board of the National Academy of Sciences—especially for adolescent and adult females. Further a 1994 National Institutes of Health Consensus Conference has recommended calcium intakes above the RDAs and above the levels consumed by most Americans. It is becoming increasingly clear that there is a need for additional dietary sources for calcium. The present invention fulfills that need by adding high levels of calcium to one of the most popular food products in the world—pasta.

Pasta is an ideal food for such calcium enrichment. It is a healthy food, low in fat and high in carbohydrates—ideal for the nutrition minded population. It has a long shelf life, especially since it has a low moisture content. Furthermore, pasta is easy to prepare. Generally, it is prepared by forming a dough from pasta flour consisting of semolina, durum flour or other types of wheat flour and water, extruding the dough into the desired product shape and then carefully drying under controlled temperature and humidity conditions. But, most important of all, it is a popular food.

Although pasta appears to be an ideal food for enriching with calcium, calcium enriched pasta has not been made and sold to consumers in the United States heretofore. The amount of calcium that has been added to pasta in the United States ranges from 500 mg to 625 mg per pound of product, the latter value corresponding to only 7.8% of the current Reference Daily intake (RDI) of calcium per 2-ounce serving.

Moreover, calcium has been added to pasta products for reasons other than for calcium fortification. For example, U.S. Pat. No. 5,211,977 to Hauser et al., describes the use of calcium to form a complex network with a gelling agent for allegedly strengthening the cohesion of the pasta and enriching the stability thereof during subsequent cooking.

It is the object of the present invention to add higher levels of calcium to the pasta product.

However, as with most foods, one cannot just modify the level of one ingredient without concomitantly investigating the effect on the organoleptic properties of the pasta. After all, it is axiomatic in the food industry that the mere addition of an ingredient would have no beneficial import unless the aesthetic quality of the food is accepted by the consumer. The objective is therefore to add the calcium to the pasta and, at the same time, maintain or improve the organoleptic properties of the pasta, including color, texture, firmness, taste, stickiness, compressibility, and the like.

The present inventors have developed such a pasta product containing a calcium level up to 100% of the RDI and higher while still maintaining the organoleptic characteristics of pasta so that it is acceptable to consumers.

SUMMARY OF THE INVENTION

Accordingly, the present invention is directed to a calcium, enriched pasta product which comprises water, wheat flour and calcium, wherein the concentration of calcium is at least 800 mg per pound of pasta, said calcium fortified pasta having the organoleptic properties, including color, texture, taste, firmness, stickiness, and compressibility of commercial pasta sold in the United States. The present invention is also directed to the process for preparing the calcium enriched pasta product comprising mixing wheat flour, water and calcium to form a mixture, extruding the mixture to prepare an extruded pasta, and drying the extruded pasta substantially at temperatures ranging from about 130° F. to about 200° F. and at a relative humidity greater than or equal to about 65% RH and more preferably ranging from about 65% to about 95% relative humidity and more preferably from about 70% to about 85% RH to obtain a pasta product containing a water content of at most about 13% by weight of the final product and a calcium content of at least 800 mg per pound of pasta.

DETAILED DESCRIPTION OF THE INVENTION

The present application is directed to a calcium enriched pasta product. The preferred pasta products are the macaroni products, including the milk and non-fat milk macaroni products, vegetable macaroni products, whole wheat macaroni products and enriched products, as defined in 21 C.F.R. §§139.110–139.138, and the noodle products, including the egg noodle and vegetable noodle products, as defined in 21 C.F.R. §139.150–139.165, with the exception that the calcium concentration is greater than the allotted amount described therein. The contents of these designated sections of Title 21 are incorporated herein by reference.

The calcium concentration of the pasta product of the present invention is at least 800 mg per pound of pasta product. Preferably, the calcium concentration ranges from about 800 mg per pound of pasta product to about 8000 mg per pound of pasta product. It is more preferable that the amount of calcium in the pasta product of the present invention ranges from about 1200 mg to about 4000 mg per pound of pasta product; it is even more preferable that the amount of calcium in the pasta product of the present invention ranges from about 2000 to about 3000 mg per pound of pasta product, and most preferably from about 2300 mg to about 2500 mg per pound of pasta. In other words, the amount of calcium in the pasta product of the present invention corresponds to a concentration preferably ranging from about 0.2% to about 2% by weight of the wheat flour (dry weight) utilized and more preferably from about 0.5% to about 1% by weight of the wheat flour (dry weight). Although the calcium concentration is higher than that found in other pasta products, the pasta product of the present invention maintains the organoleptic properties of quality pasta, i.e., pasta commercially sold in the U.S.

To achieve a quality of pasta that is acceptable to consumers, the inventors have found that the source of calcium is critical, i.e., not all calcium sources can be utilized as an ingredient in the pasta product of the present invention. The calcium utilized is a food acceptable salt consisting of calcium and a counteranion and is non-toxic.

In addition, the calcium salt must be substantially soluble in water at the temperatures and pressures utilized in the extruder. Finally, the counteranion must be substantially inert to the pasta dough. For instance, the counteranion cannot be a strong base or oxidant such as calcium oxide which interacts with the pasta dough. Without wishing to be bound, it is believed that the strong base or oxidant interacts with the protein, thereby interfering with the protein matrix of the pasta dough, and providing a very poor pasta product that does not have the requisite organoleptic qualities.

The calcium salt that is utilized may be an inorganic salt or an organic salt. If the salt is an organic salt, then the counteranion is a lower alkyl group having one to six carbon atoms that is substituted with one or two carboxy groups, for example, formic, acetate, citrate, oxalate, propionate, malonate, succinate, glutamate, and the like. Examples of calcium sources include calcium acetate, calcium butyrate, calcium carbonate, calcium chloride, calcium citrate, calcium formate, calcium fumarate, calcium lactate, calcium malate, calcium malonate, calcium phosphate (tribasic), calcium monohydrogen phosphate (dibasic), calcium dihydrogen phosphate (monobasic), calcium phosphite, calcium oxalate, calcium propionate, calcium succinate, calcium tartrate, calcium valerate, and the like. It is also preferred that the calcium salt is substantially anhydrous. The preferred salts are calcium chloride, calcium citrate, calcium carbonate, calcium phosphate (tribasic), calcium monohydrogen phosphate and calcium dihydrogen phosphate and the like. The most preferred calcium salts are calcium phosphate, calcium monohydrogen phosphate, calcium dihydrogen phosphate, calcium citrate, and the like.

As used herein, the term "calcium phosphate" is a generic term which includes calcium phosphate tribasic, calcium monohydrogen phosphate and calcium dihydrogen phosphate.

When referring to the salt $Ca_2(PO_4)_3$, the term "calcium phosphate tribasic" will be utilized.

In addition, besides calcium, the pasta of the present invention is comprised of wheat flour, which is the flour generally utilized in making pastas. As used herein, the term "wheat flour" includes the entire family of wheat flour products, such as Semolina, Durum flour, Farina, Clear Flour, or combination thereof, and the like. Preferred wheat flour is durum flour, semolina, or any combination thereof. This ingredient is by the far the bulk of the dry solids. It is preferred that at least 75% of the dry solid weight be comprised of wheat flour. It is more preferred that at least 85% of the pasta product (dry solid weight) be comprised of wheat flour and is most preferred that at least 90% of the dry weight be wheat flour.

Another ingredient of the pasta product of the present invention is water. Preferably, the amount of water present in the final dry pasta product of the present invention is less than about 13% by weight. Moreover, it is preferable that the pasta product contains at least about 6% water by weight. It is most preferred that the pasta product contains water ranging from about 10% to about 12% by weight. Thus, the total dry solids content, including the wheat flour and the calcium, and any other additional ingredient described hereinbelow in the pasta product of the present invention comprises at least 87% by weight of the final product and more preferably from about 88% to about 94% by weight of the final product.

The pasta product of the present invention may contain additional ingredients that are normally used in pasta products, such as flavoring agents, vegetable products, vitamins, emulsifiers, gelling agents, and the like. More specifically, these additional ingredients include:

1. Egg, egg yolk, egg white, frozen egg white, dried egg white or combination thereof. If present, it is preferred that these are present in amounts not less than 0.5% and not more than 2.0% by weight of the finished product;

2. Disodium phosphate. It is preferred that, if present, it is present in a quantity not less than 0.5% and not more than 1% by weight of the finished food;

3. Flavoring agents, such as onions, celery, garlic, bay leaf, or salt, or combination thereof in a quantity which seasons the food;

4. Gum gluten. It is preferred that it is present in such quantity that the protein content of the finished food is not more than about 13% by weight;

5. Concentrated glycerol monostearate (containing not less than 90% monoester). It is preferred that if present, it is present in a quantity not exceeding 2% by weight of the finished food;

6. Vitamins and minerals, e.g., vitamin D, thiamin, riboflavin, niacin or niacinamide and iron.

7. Partly defatted wheat germ. It is preferred that it be present in amounts not exceeding 5% by weight of the finished product.

8. Gelling agents in gelling effective amounts. Examples include gellan, alginate, including propylene glycol alginate and the like. It is preferred that it is present in amounts ranging from about 0.1% to about 0.8% by weight and preferably from about 0.2% by weight to about 0.6% by weight of the final pasta product.

9. Vegetables, such as tomato, artichoke, beet, carrot, parsley, lettuce, spinach, and the like. The vegetables used may be fresh, canned, dried, or in the form of puree or paste. It is preferred that the vegetables are present in amounts greater than about 3% by weight of the final pasta product.

10. Artificial additives, such as color additives, artificial flavorings, artificial sweeteners, chemical preservatives, and the like.

The pasta product of the present invention is prepared by first mixing the wheat flour, water, and non-toxic calcium salt together to form a pasta paste. Any of the optional ingredients discussed hereinabove are also added. The water is present in amounts sufficient to form a paste with the wheat flour. It is preferred that the moisture content at this stage is at least about 25% by weight and more preferably ranging from about 25% to about 40% by weight and most preferably ranging from about 28% to about 35% by weight of the pasta dough. The ingredients may be added in any order, for example, water may be added first, or it may be added last. Thus, for example, the non-toxic calcium salt may be added to the dried mixture before water is added to the wheat flour or the non-toxic calcium salt may be added to the wheat flour after water addition thereto or the calcium salt is added to the water which is then added to the pasta flour, etc. It is preferred that the non-toxic calcium salt is added to the dried mixture prior to water addition.

The product prepared above next undergoes extrusion. The mixture is introduced into an extruder wherein the product is further mixed, kneaded and extruded. The extrusion is conducted at temperatures and pressures effective to knead the pasta mixture into a stiff dough and force the material through a die at the opposite end thereof. It is preferred that the extrusion be conducted at a pressure greater than about 500 psi, and more preferably at pressures ranging from about 1200 to about 2500 psi. Moreover, it is preferred that the pasta dough be extruded at temperatures less than 130° F., and more preferably at temperatures ranging from about 110° F. to about 120° F.

The pasta of the present invention are extruded in the shapes and sizes that are typical of pasta products. The pasta products can be divided into two categories, long goods and short goods. The pasta shapes include but are not limited to such long goods as spaghetti, spaghettini, vermicelli, capellini, fettucini, linguini, lasagna, perciatelli, noodles, fusilli, mafalde, and the like and such short goods as ditali, ditalini, elbow macaroni, rings, elbow spaghetti, tubettini, ziti, pastini, manicotti, penne, radiatore, mostaccioli, shells, rigatoni, rotini, bow ties, butterflies, egg noodles, vermicelli wheels, orzo, quadratini, and the like. The shape and size of the pasta product are not only determined by the diameter of the die, but also by the flow rate across the die. Shorter pasta goods are cut by a rotary knife that scrape the surface of the die.

The extruded pasta next, optionally but preferably undergoes a predrying step, which is conducted at temperatures which may be outside of the ranges given hereinabove. This step is necessary if the moisture content of the extruded pasta is greater than about 28% by weight. If the moisture content of the extruded pasta is less than about 28%, then the extruded pasta undergoes drying, as described hereinbelow.

The pasta product of the present invention, especially the long goods, preferably undergoes this predrying step. The short good pasta product of the present invention may also undergo predrying, if desired. Predrying serves two functions. It rapidly reduces the moisture on the surface of the pasta to a level that avoids fermentation and damage to the pasta resulting from fermentation. Preferably, the moisture level of the extruded pasta in the predrying step is reduced to about 20% to about 28% by weight. At this moisture level, the pasta is still flexible and cracking and checking does not develop. Predrying also sets the shape of the pasta, thereby preventing deformation during drying. Predrying is conducted under conditions sufficient to reduce the moisture level of the extruded pasta to less than about 28% and more preferably from about 20% to about 28% by weight. It is preferably conducted at temperatures ranging from about 100° F. to about 180° F., and more preferably from about 120° F. to about 170° F. It is a very quick procedure, preferably being performed in less than about 2 hours; preferably, predrying is conducted for at least 0.5 hour and more preferably for about 0.5 hour to about 1.5 hours and most preferably for about 0.75 hours to about 1 hour. The predrying step is significantly shorter than the drying step. The predrying step may be conducted at low or high relative humidity. For example, it may be conducted at relative humidities as low as about 10% RH or as high as about 95% RH.

The method utilized in the predrying step is not critical, as long as the moisture content of the extruded pasta has been reduced to the levels indicated hereinabove. Predrying conditions may vary depending on whether the goods are short goods or long goods.

With respect to short goods, predrying is conducted so that the moisture content is reduced to about 23% to about 28% by weight. It is preferably conducted at about 130° F. to about 170° F. at relative humidities ranging from about 20% to about 40%. In this embodiment, it is preferred that predrying lasts for about 0.5 to 1.5 hour. In a more preferred embodiment, the moisture content of the pasta is reduced to about 25% to about 27% by weight. In this more preferred embodiment, the predrying is conducted at about 150° F. to about 170° F., and at about 20 to about 25% relative humidity for about 0.5 hours to 0.75 hour.

With long goods, the preferred predrying conditions are different and may occur in one or two steps. The relative humidities of predrying for long goods are preferably conducted at relative humidities ranging from about 35% RH to about 65% RH and more preferably from about 50% RH to about 60% RH. In a preferred embodiment, predrying of long goods is conducted at temperatures ranging from about 130° F. to about 170° F. for about 0.5 hour to about 2 hours. In the most preferred conditions, it is conducted in two stages. In the first step, it is conducted at the temperature ranging from about 130° F. to about 140° F. at about 45% RH to about 55% RH and more preferably at about 50% RH from about 10 minutes to about 0.5 hour and then in the second step, it is conducted from about 150° F. to about 170° F. at about 50% RH to about 55% RH for about 0.6 hours to about 1.5 hour.

When the moisture level of the pasta is less than about 28%, the pasta is dried in air at effective temperatures to reduce the moisture content of the extruded pasta to the desired level, i.e., the moisture content is reduced to less than about 13% by weight of the final product. Although some moisture content of the pasta is reduced during the predrying step, the moisture content is reduced to the desired levels during the drying step. The drying step is critical with respect to the present invention. Effective temperatures for substantially drying the pasta ranges from about 130° F. to about 200° F. The relative humidity is maintained at a level that controls the drying rate so that the pasta does not check or crack. The effective relative humidity is greater than about 65%, and more preferably ranges from about 65% RH to about 95% RH and most preferably from about 70% RH to about 85% RH.

In preparing the pasta product of the present invention, the inventors found that two features of the process were critical.

First, all of the calcium is added to the pasta mixture prior to the extrusion step. Addition of calcium in a post-extrusion step to the dough detracts from the organoleptic properties of the pasta, thereby making it unacceptable to consumers. More specifically, when the calcium is added to the pasta mixture after or during the extrusion step, most of the calcium does not adhere to the pasta. The calcium which does adhere to the pasta is on the surface of the pasta and diffuses from the pasta when the pasta is cooked in the food preparation process. In addition, the finished pasta product formed therefrom is non-homogenous and has a substantially gritty texture. On the other hand, when the calcium is added to the pasta mixture prior to the extrusion step, a pasta product having better texture and overall quality was produced. The calcium is integrated into the pasta and the pasta product is homogenous, has a non-gritty texture and has the organoleptic qualities of high quality commercial pasta.

This addition of calcium prior to the extrusion is in sharp contrast with the process used in U.S. Pat. No. 5,211,977 wherein extruded pasta is contacted with an aqueous calcium solution.

Another critical parameter in preparing the pasta product of the present invention is in the drying step, whereby appropriate temperatures and relative humidities for drying are required. The objective of the drying step is to reduce the water content of the pasta dough to 13% by weight or lower. If pasta is dried too slowly, the pasta spoils due to microbiological growth. If pasta is dried too quickly, moisture gradients are created that crack or check the pasta.

The inventors have found that if the pasta of the present invention is not dried at the temperatures and at relative humidities as described hereinabove, the pasta product produced is of an inferior quality. At temperature and relative humidity outside of the above ranges, the pasta product exhibits stickiness and loses its elastic bite, its amber color, its softness, and its tolerance to overcooking,—i.e., the pasta does not possess the organoleptic properties, including texture, color, physical characteristics (e.g, stickiness, softness) typically found in commercial pasta sold in the U.S. However, they have found a certain range of temperature and relative humidity for drying the pasta that produces a quality product having the requisite characteristics.

More specifically, the inventors have found that an excellent pasta product is achieved when the extruded pasta product is dried at temperatures and relative humidity indicated herein. A more preferred temperature range for substantially drying the extruded pasta product ranges from about 150° F. to about 190° F. and more preferably from about 160° F. to about 180° F. The preferred relative humidity for substantially drying the extruded pasta ranges from about 65% to about 95% RH, and more preferably from about 70% RH to about 85% RH.

The drying conditions vary, dependent upon whether the pasta is a short good or a long good. Since the short goods are smaller and have thinner walls, drying of the short goods is usually quicker and the conditions are less vigorous relative to long goods.

With respect to long goods, there are three preferred drying conditions. In one embodiment, after predrying at a temperature of about 110° F. to about 115° F., the drying is effected at temperatures of 130° F. to about 140° F. The RH during this drying cycle preferably ranges from about 65% to about 85%. The drying time is about 8 to 12 hours. In a more preferred embodiment, after predrying at a temperature of about 110° F. to about 115° F., drying is effected at about 140° F. to about 160° F., and more preferably from about 150° F. to about 160° F. The RH during this drying cycle ranges from about 65% to about 85%. Drying time is usually about 8–12 hours. In the most preferred embodiment, after predrying at a temperature of about 120° F. to about 130° F., drying is effected at temperatures ranging from about 160° F. to about 200° F. and more preferably from about 185° F. to about 195° F. The RH during this drying cycle ranges from about 65% to about 95%. Drying usually takes about 5 to 8 hours.

With respect to short goods, there are two preferred drying conditions. In one embodiment, drying is maintained at a temperature of about 130° F. to about 150° F. through the drying cycle. The RH during this drying cycle ranges from about 65% to about 85%. The drying time is about 6 to 8 hours. In a more preferred embodiment drying is maintained at a temperature of 150° F. to about 180° F. through the drying cycle. The RH during this drying cycle ranges from about 65% to about 85%. Drying time is about two to about four hours.

After drying, the pasta is removed to a storage unit where it is cooled to room temperature prior to packaging.

The pasta product so produced as described hereinabove can then be utilized for eating by boiling the same in water, which is optionally salted until sufficiently cooked, i.e., when the white core disappears.

The pasta product of the present invention, when cooked, has the organoleptic properties typical of commercial pasta sold in the U.S. It has the yellow or amber color, appearance, texture, odor, taste, mouthfeel and consistency of typical pasta sold in the U.S. It is homogenous. It exhibits the firmness and tenderness, compressibility and stickiness and elastic bite, and resilience of typical commercial pasta sold in the U.S. It exhibits tolerance to overcooking, such that it minimizes any loss of organoleptic properties when overcooked and substantially retains its organoleptic properties when minimally overcooked.

For example, by definition firmness is measured as the force (grams) required to compress two pieces of pasta to 50% of their cooked thickness (or height). It has been found that the firmness of an ideally cooked spaghetti of the present invention with a thickness of 0.071±0.002 inches to be in the range from about 3200 to about 4000 g-cm, ranges typically found in high quality pasta products.

Thus, the inventors have found a means of adding large amounts of calcium to the product while still maintaining the quality and texture of the pasta.

It is to be noted that unless specified to the contrary, all percentages are by weight of the final pasta product. If the weight percentage refers to the dry weight, i.e., the weight of the product without water, then it will bo so indicated.

The following examples further illustrate the present invention.

EXAMPLE 1

Semolina (10.357 Kg) was mixed with calcium carbonate (0.143 Kg) in 3200 mL of water and extruded in an Afrem Pasta Press®, in which the compression screw was rotating at 35.0 rpm under a mixing vacuum of −0.6 bar. The extruder successively comprises various zones surrounded by separate jackets in which fluids are able to circulate at different temperatures. After being mixed in the extruder, the pasta was kneaded and extruded. The pasta was extruded at a temperature of 112.1° F. and a pressure of 742 psi through a die consisting of a thick bronze plate drilled with a plurality of holes approximately 0.076 inches in diameter. The extruded product was dried at 133° F. at a relative humidity of 80.5% for 3 hours and then at 163° F. for 6.3 hours at a relative humidity of about 72%.

The product produced had a calcium content of approximately 2400 mg/lb of product and a water content of about 9.2% by weight. The product (6 oz) was placed into 3 quartz of hot water and was cooked for 10 minutes, 12 minutes (optimum time) and 17 minutes (overcooked). The cooked product produced was light yellow in color with a slight grey hue and had excellent textural qualities.

For purposes of comparison, a semolina product was prepared as above except without any calcium (control). The pasta product produced hereinabove had an agreeable color, odor, taste, consistency and appearance similar to the control pasta.

EXAMPLE 2

The procedure is similar to that of Example except that 10.336 Kg of semolina was mixed with 0.1433 Kg of calcium carbonate and 0.021 Kg of propylene glycol alginate (PGA) in 3200 mL water. The mixture was introduced into a Afrem Pasta Press® extruder rotating in the first part thereof at 35.2 rpm at a vacuum of −0.6 bar. The pasta was extruded at a temperature of 112.1° F., and an extruder pressure of 706 psi through the die containing a plurality of holes approximately 0.076 inches in diameter. The extruded product was dried in accordance with the procedure described in Example 1. The product formed was a spaghetti product containing about 9.2% moisture content and approximately 2400 mg of calcium per pound of product and about 0.02% (w/w) PGA. Cooking was effected as in Example 1. The cooked products were light yellow in color and had good textural properties.

For purposes of comparison, the above product was prepared, except that it did not contain any calcium (control). The textural properties of the above product were similar to that of the control as in Example 1.

EXAMPLE 3

The procedure of Example 1 was repeated except that 10.315 Kg of semolina was mixed with 0.143 Kg of calcium carbonate and 0.042 Kg of propylene glycol alginate (PGA) in 3200 mL water. The resulting mixture was introduced into an Afrem Pasta Press® single extruder rotating at 35.2 rpm at a vacuum of −0.6 bar. After the mixing was completed, the mixture passed through the various zone of the extruder wherein the pasta was extruded at a temperature of 112.6° F. and an extruder pressure of 706 psi through a die consisting of a plurality of holes approximately 0.076 inches in diameter. The extruded product was dried as in Example 1. The dried product was a spaghetti shaped pasta containing about 2400 mg calcium and 0.4% PGA and a water content of approximately 9.2% by weight. Cooking was effected as in Example 1. The cooked products had excellent textural qualities, but was yellow in color with slight grey hue.

The textural properties were similar to the control product, i.e., a pasta product prepared as hereinabove except without any calcium.

EXAMPLE 4

The procedure of Example 1 was repeated except that 10.147 Kg of semolina, 0.143 Kg calcium carbonate and 0.210 Kg of glycerol monostearate (GMS) were mixed in 3200 mL water and the mixture was introduced into the Afrem Pasta Press® single screw extruder rotating in the mixing zone at 35.4 rpm at a mixing vacuum of −0.6 bar. The pasta was next passed to a zone wherein the pasta was extruded at a temperature of 112.4° F. through a die containing a plurality of holes having a diameter of 0.076 inches. The extruded product was dried in accordance with the procedure of Example 1. The spaghetti pasta product so produced had a water content of approximately 10.3% by weight and contained 2.0% by weight GMS and about 2400 mg calcium per pound of product. Cooking was effected as in Example 1. The cooked products were light yellow in color with a slight grey hue. In addition, the cooked products had excellent textural qualities, similar to that of a control, which was prepared as hereinabove, except that no calcium was added.

EXAMPLE 5

The procedure of Example 1 was repeated except that 10.306 Kg semolina was mixed with 0.194 Kg of calcium phosphate(dibasic) in 3000 mL water. The mixture was placed into a Afrem Pasta Press® extruder rotating in the mixing zone at 34.7 rpm at a vacuum of −0.6 bar. The pasta was extruded at a temperature of 113.8° F. and an extruder pressure of 920 psi through a die having a plurality of holes having a diameter of 0.076 inches. The product was dried at 133° F. at a relative humidity of 80.5% for 2.75 hours and 163° F. at a relative humidity of about 76% for about 2 hours and then cooled to 86° F. at a relative humidity of 47% for 4.5 hours. The dried product was a spaghetti shaped pasta and contained approximately 9.1% moisture content by weight and about 2445 mg calcium per pound of product.

The pasta product was cooked in accordance with the procedure of Example 1. The amount of calcium present in the cooked product was about 2400 mg/pound after cooking.

Moreover, the product color of the uncooked as well as the cooked products was light yellow. The textural qualities were excellent.

For purposes of comparison, the above product was prepared except no calcium was added thereto (control). The texture, taste, smell, appearance, consistency, and mouthfeel of the pasta product were like that of the control.

EXAMPLE 6

The procedure of Example 5 was repeated except that the extruded product was dried at 181° F. for 2.6 hours at a relative humidity of 85% and then cooled at 91° F. and 66° F. for 1.1 hours and 4 hours, respectively. The spaghetti product had a moisture content of 9.1% by weight and contained approximately 2445 mg of calcium per pound. The color was amber yellow, and had the same textural quality as the pasta product produced in Example 5.

EXAMPLE 7

The procedure of Example 1 was repeated except that 10.147 kg semolina was mixed with 0.353 kg mono-basic calcium phosphate in 3000 mL water until homogenous. The mixture was then introduced into a Afrem Pasta Press® having a compression screw rotating in the mixing zone at 34.9 rpm and a mixing vacuum of −0.6 bar. The pasta was extruded at a temperature of about 112.5° F. and a pressure of 866 psi through a die with a plurality of holes having a diameter of 0.076 inches. The extruded product was dried at 133° F. for 3.25 hours at a relative humidity of 80.5% and then at 163° F. at a relative humidity of 80.5% for about 2.8 hours. The spaghetti shaped pasta product had a final water content of 10.23% by weight, and had a calcium content of about 2400 mg per pound of pasta. Cooking was effected as in Example 1. It had excellent color (amber) and texture.

EXAMPLE 8

The procedure of Example 7 was repeated except that 10.229 Kg of semolina was mixed with 0.271 Kg of calcium citrate in 3100 mL of $H_2O$. The spaghetti shaped pasta product had a water content of about 11.06% by weight. The resulting product contained 2536 mg of calcium per pound of pasta product. The product had excellent texture and color.

The pasta product was cooked for eleven minutes in boiling water containing approximately 100 grams of pasta per liter of water. It had an agreeable taste and non-sticking texture. The amount of calcium present after cooking was 2278 mg per pound of pasta. The cooked product had excellent texture and color (light yellow).

EXAMPLE 9

The procedure of Example 5 was repeated except that the product was dried in accordance with the protocol of Example 7. The resulting product had excellent textural properties and excellent color.

EXAMPLE 10

The procedure of Example 1 was repeated except that 0.247 kg of calcium phosphate dibasic was mixed with 7.753 kg of semolina. The finished product after cooking contained 4000 mg calcium per pound of pasta or approximately 50% of the R.D.I.

EXAMPLE 11

The procedure of Example 1 was repeated except that 0.433 kg of calcium phosphate (dibasic) was mixed with 7.506 kg of semolina. The resulting finished product after cooling contained 8000 mg of calcium per pound of pasta or ~100% of the R.D.I.

EXAMPLE 12

The firmness of the pasta product of Examples 5, 10 and 11 as well as that of a control and a product prepared in accordance with Example 1, except that the product was dried at 113–115° F. (low temperature) was determined as follows: 20 strands of pasta was placed into 4 cups of boiling water and cooked until the core disappeared. The product was then submerged into approximately 6 cups of room temperature D.I. water for two minutes and then drained for two minutes. Two strands of cooked pasta were placed onto the bottom plate of a TAX-12 Texturometer (50 Kg load cell and 1 gram sensitivity) programmed to calculate firmness. The Texturometer had a bottom plate which is 90 mm long×100 mm wide×10 mm thick metal plate, and a top plate which is 38 mm wide×9 mm thick×50 mm long. The Texturometer is attached to a recorder.

The strands were placed so that they were approximately 0.5 inches apart. The top plate was brought down to slightly touch the surface of the pasta and the gap was measured in millimeters. The contact area was set on the Texturometer at 100 mm$^2$, the contact force at 0.10 g, and the force threshold was set at 25 grams. With the sample in position directly below the top plate, the compression speed was set at 1.0 mm/sec, compression distance set at 50% of the gap distance and hold time set at 10 sec., the computer was turned on. The top plate was brought down onto the sample, with the cooked pasta sample being compressed 50% of its height. The sample was relieved of all stress for 10 seconds to allow for normal relaxation and then a second compression was preformed. The test results were recorded and the firmness determined.

Using this technique, the various pasta products measured 0.69 inches in diameter in the dry state and had cooked firmness values as followed:

| SAMPLE NO. | PRODUCT | DRYING | COOK TIME | FIRMNESS |
|---|---|---|---|---|
| 1 | No added calcium | High temp. | Until core is gone | 3585 g |
| 2 | 2400 mg calcium | High temp. | Until core is gone | 3852 g |
| 3 | 4000 mg calcium | High temp. | Until core is gone | 3723 g |
| 4 | 8000 mg calcium | High temp. | Until core is gone | 3323 g |
| 5 | 2400 mg calcium | Low temp. | Until core is gone | 2843 g |

The firmness of Samples 2–4 were similar to that of the control, while that of sample 5 was unsatisfactory.

COMPARATIVE EXAMPLE 1

The procedure of Example 1 was repeated except that 10.420 kg of semolina was mixed with 0.80 kg of calcium oxide. The product produced was very unsatisfactory. It was dark brown in color upon extrusion, had an odor and was very grainy. Cooking was effected as in Example 1. The cooked product remained dark brown, was very soft and very sticky—properties which made this product quite undesirable.

EXAMPLE 13 AND COMPARATIVE EXAMPLE 2

(a) 10% (w/w) calcium malate (1.05 Kg) was mixed with 90% (w/w) Semolina (9.45 Kg) in 3200 mL of water for 10 minutes and extruded in an Afrem Pasta Press®, in which the compression screen was rotated at 35 rpm under a mixing vacuum of −0.6 bar. The extruder successfully comprises various zones surrounded by separate jackets in which fluids are able to circulate at different temperatures. After being mixed in the extruder for 1 minute, the pasta was kneaded and extruded through a fettucine die consisting of openings 4.2 mm long by 1.2 min wide. The extruder product was predried and dried under the following conditions:

| PREDRYING AND DRYING AND COOLING PROFILE | | | |
|---|---|---|---|
| Segment | Time (Hrs) | Temp ° F. | Relative Humidity |
| 1 | 1/9 | 86 | 92 |
| 2 | 1/9 | 86 | 79 |
| 3 | 2/3 | 113 | 80.5 |
| 4 | 1/4 | 133 | 85 |
| 5 | 3 | 133 | 85 |
| 6 | 1/3 | 163 | 82.5 |
| 7 | 2.5 | 163 | 82.5 |
| 8 | 2 | 86 | 60 |
| 9 | 5.5 | 86 | 60 |

Segments 1, 2, and 3 represent predrying steps, steps 4–7 are the drying steps while steps 8 and 9 are cooling steps.

(b) The pasta product thereby obtained was compared with the pasta product obtained from U.S. Pat. No. 5,508,053 to Villota, et al. but with the addition of calcium thereto. More specifically, the product was prepared as in step (a) except the extruded product was pre-dried, dried and cooled under the following conditions in accordance with Example 7 of U.S. Pat. No. 5,508,053.

| Segment | Time (min) | Temp ° C. | Relative Humidity % |
|---|---|---|---|
| 1 | 1 | 25 | 50 |
| 2 | 6 | 35 | 50 |
| 3 | 6 | 45 | 50 |
| 4 | 6 | 55 | 50 |
| 5 | 6 | 65 | 50 |
| 6 | 9 | 74 | 60 |
| 7 | 4 | 72 | 60 |
| 8 | 4 | 70 | 62 |
| 9 | 30 | 68 | 62 |
| 10 | 4 | 70 | 51 |
| 11 | 4 | 72 | 51 |
| 12 | 180 | 74 | 51 |
| 13 | 10 | 68 | 80 |
| 14 | 10 | 60 | 80 |
| 15 | 10 | 52 | 80 |
| 16 | 10 | 44 | 80 |
| 17 | 10 | 36 | 80 |
| 18 | 10 | 32 | 50 |
| 19 | 10 | 28 | 50 |
| 20 | 10 | 25 | 50 |

The products produced by both processes contained a calcium content of approximately 8750 mg/lb of pasta.

The pasta products produced from the processes described in parts (a) and (b) hereinabove were compared. Noticeably, there was a difference in color. More specifically, the product produced in accordance with the procedure of (a) was more yellow in color, which yellow coloring was more consistent with the color commercially found in commercial products than the product produced in accordance with the procedure of (b).

The products produced in (a) and (b) were cooked as follows:

Six ounces of each product produced in (a) and (b) were separately placed into 3 quarts of hot water and cooked for nine minutes. The products produced therefrom were compared.

There was a marked difference noted in the two products. Texturally, the product produced in accordance with (a) felt firmer than the product produced in accordance with the procedure of (b). In addition, the colors of the products were different, with the former being yellower in color than the latter.

Furthermore, analytical firmness testing of the two products was conducted as described in Example 12. More specifically, the products were cooked for 9 minutes, cooled in room temperature water for two minutes and drained for two minutes prior to testing. The firmness was conducted by measuring the force (grams) required to compress each fettuccine to 50% of their cooked thickness (or height), as described in Example 12 and the results compared. The firmness results were obtained by averaging data from 10 compression tests.

The average firmness of the product produced in (a) was significantly greater than that of the product produced in step (b). More specifically, the firmness of the product produced in step (a) had an average of 3638 g-cm, while the average firmness of the product produced in step (b) had an average firmness of 2947 g-cm. In other words, the firmness of the product produced in (b) was 19% lower than that of the product produced in accordance with the present process.

EXAMPLES 14 & 15 AND COMPARATIVE EXAMPLES 3 & 4

Products were additionally prepared containing 2% and 5% Calcium Malate, in accordance with the procedures described in (a) and (b) of the Example 13 and Comparative Example 2, (the previous example) except 2% and 5% calcium malate was added to the semolina. The products were extruded through a fettucine die, as described in the previous example. The products were either dried in accordance with the procedure described in step (a) or step (b) of the previous example. The 2% and 5% samples obtained in accordance with the procedure described in step (a) of the previous example both exhibited the same trends as did the product produced in step (a) of the previous example with respect to all observable attributes: the product produced in accordance with the present invention containing 2% and 5% calcium malate were more yellow in color, and felt firmer than that of the corresponding comparative product, respectively produced in accordance with the procedure of step (b) of the previous example, but containing 2% or 5% calcium malate.

The data in Examples 13–15 and Comparative Examples 2–4 show that the drying profile also affects the quality of the pasta produced, and that if a pasta product is dried according to a procedure outside of the parameters described herein, the pasta product so produced is inferior to the pasta product produced in accordance with the present invention.

The above preferred embodiments and examples are given the illustrate the scope and spirit of the present invention. The embodiments and examples described herein will make apparent to those skilled in the art other embodiments and examples. These other embodiments and examples are within the contemplation of the present invention. Therefore, the present invention should be limited only by the appended claims.

What is claimed is:

1. A calcium enriched pasta product comprising at least about 75% by dry weight wheat flour, at most 13% by weight water and at least about 800 mg of calcium per pound of product, said calcium being obtained from a food acceptable calcium salt comprising a calcium cation and an anion, said anion being inert to the pasta.

2. The pasta product of claim 1 in which the calcium is present in amounts ranging from about 800 mg to about 8000 mg per pound of product.

3. The pasta product according to claim 1 in which the calcium is present in amounts ranging from about 1200 mg to about 4000 mg per pound of pasta.

4. The pasta product according to claim 1 in which the calcium is present in amounts ranging from about 2000 to about 3000 mg per pound of pasta.

5. A calcium enriched pasta product comprising at least about 75% by dry weight wheat flour, at most 13% by weight water and a calcium salt wherein the calcium of the salt is present in an amount of at least about 800 mg per pound of product, said calcium salt being calcium citrate, calcium phosphate (tribasic), calcium monohydrogen phosphate (dibasic), or calcium dihydrogen phosphate (mono basic).

6. The pasta product according to claim 5 wherein the calcium salt is calcium monohydrogen phosphate (dibasic).

7. The pasta product according to claim 5 wherein the calcium of the salt is present in amounts ranging from about 800 mg to about 8000 mg per pound of product.

8. The pasta product according to claim 7 in which the calcium is present in amounts ranging from about 1200 mg to about 4000 mg per pound of pasta.

9. The pasta product according to claim 8 in which the calcium is present in amounts ranging from about 2000 to about 3000 mg per pound of pasta.

10. The pasta product according to claim 5 which additionally comprises a gelling agent, a mineral, a vitamin, a flavoring agent, an emulsifier, a vegetable, egg white or egg yolk or combination thereof.

11. The pasta product according to claim 10 wherein the vegetable is tomato, lettuce, spinach, carrot, beet or parsley.

12. The pasta product of claim 5 in which gum gluten, glycerol monostearate, disodium phosphate, vitamin D, niacin, riboflavin, thiamine, propylene glycol alginate, partly defatted wheat germ, egg, egg white, egg yolk, vegetable or combination thereof is additionally present.

13. The pasta product according to claim 5 in which the water content ranges from about 6% by weight to about 13% by weight.

14. The pasta product according to claim 5 which contains wheat flour in at least about 85% by weight (dry weight).

15. A process for preparing a pasta enriched product comprising at least 75% by dry weight flour, at most 13% by weight water and at least about 800 mg of calcium per pound of product, said process comprising:

(a) mixing wheat flour, water and a food acceptable calcium salt to prepare a homogenous mixture, said calcium salt being present in an amount sufficient to produce a calcium concentration of at least 800 mg/pound of pasta product, the moisture content of said mixture content ranging from about 25% to about 40% by weight;

(b) extruding the mixture to provide an extrusion shaped pasta;

(c) drying the pasta at temperatures ranging from about 130° F. to about 200° F. at a relative humidity of at least about 65% RH for sufficient time until the moisture content is at most 13% by weight, said calcium food acceptable salt consisting of calcium and a counterion being soluble in the water during said extrusion step, and said counterion being substantially inert towards the pasta product.

16. The process according to claim 15 wherein the food acceptable calcium salt is calcium oxalate, calcium citrate, calcium phosphate (tribasic), calcium monohydrogen phosphate (dibasic), calcium dihydrogen phosphate (monobasic), calcium carbonate, calcium chloride, calcium propionate, calcium lactate, calcium malate, calcium tartrate, calcium valerate, calcium butyrate, calcium acetate, or calcium succinate.

17. The process according to claim 16 wherein the food acceptable calcium salt is calcium citrate, calcium phosphate (tribasic), calcium monohydrogen phosphate (dibasic), or calcium dihydrogen phosphate (monobasic).

18. The process according to claim 15 wherein the amount of calcium in the pasta product ranges from about 800 mg to about 8000 mg per pound of pasta.

19. The process according to claim 18 wherein the amount of calcium in the pasta product ranges from about 1200 mg to about 4000 mg per pound of pasta.

20. The process according to claim 19 wherein the amount of calcium in the pasta product ranges from about 2000 mg to about 3000 mg per pound of pasta.

21. The process according to claim 15 wherein an additional ingredient is added to the mixture of step (a) wherein said additional ingredient comprises a gelling agent, a mineral, a vitamin, a flavoring agent, an emulsifier a vegetable, egg, egg white, egg yolk or combination thereof.

22. The process according to claim 15 wherein an additional ingredient comprising gum gluten, glycerol monostearate, disodium phosphate, egg white, egg yolk, egg, vitamin D, niacin, riboflavin, thiamine, propylene glycol alginate, partly defatted wheat germs, lettuce, tomato, spinach, beets, carrot, or combination thereof is additionally mixed with the pasta flour, calcium and water.

23. The process according to claim 15 wherein the extruded pasta in step (c) is dried at temperature ranging from about 150° F. to about 190° F.

24. The process according to claim 23 wherein the extruded pasta in step (c) is dried at temperatures ranging from about 160° F. to about 180° F.

25. The process according to claim 15 wherein the relative humidity ranges from about 65% to about 95%.

26. The process according to claim 25 wherein the relative humidity ranges from about 70% RH to about 85% RH.

27. The process according to claim 15 wherein the pasta product produced is a long good and wherein the extruded pasta undergoes predrying prior to the drying step.

28. The process according to claim 27 wherein the moisture level in the extruded predryed product ranges from about 20% to about 28% by weight.

29. The process according to claim 27 wherein the extruded pasta is predryed at a temperature of about 110° F. to about 115° F. and then is dried at a temperature of about 130° F. to about 140° F. at a relative humidity ranging from about 65% to about 85%.

30. The process according to claim 27 wherein the extruded pasta is predried at a temperature ranging from about 110° F. to about 115° F. and is dried at a temperature ranging from about 140° F. to 160° F. at a relative humidity of about 70% to about 85%.

31. The process according to claim 30 wherein the extruded pasta is dried at a temperature ranging from about 150° F. to about 160° F.

32. The process according to claim 27 wherein the extruded pasta is predried at a temperature ranging from about 120° F. to about 130° F. and is dried at a temperature from about 160° F. to about 200° F. at a relative humidity ranging from about 65% to about 95%.

33. The process according to claim 32 wherein the extruded pasta is dried at a temperature ranging from about 185° F. to about 195° F.

34. The process according to claim 15 wherein the pasta product is a short good, and wherein the extruded product is dried at a temperature ranging from about 130° F. to about 150° F. at a relative humidity ranging from about 70% to about 85%.

35. The process according to claim 15 wherein the pasta product is a short good and wherein this extruded product is dried at a temperature ranging from about 150° F. to about 180° F. at a relative humidity ranging from about 70% to about 85%.

* * * * *